United States Patent Office 3,682,866
Patented Aug. 8, 1972

3,682,866
POLYAMIDES HAVING IMPROVED AFFINITY
FOR BASIC DYESTUFFS
John David Garforth, Manchester, England, assignor to
Imperial Chemical Industries Limited, London, England
No Drawing. Filed Aug. 14, 1970, Ser. No. 70,616
Int. Cl. C08g 20/20
U.S. Cl. 260—78 R
3 Claims

ABSTRACT OF THE DISCLOSURE

Synthetic linear polyamides having an improved affinity for basic dyestuffs containing dicarboxy metal cyclohexane monosulfonate moiety.

This invention relates to fibre-forming synthetic linear polyamides having an improved affinity for basic dyestuffs.

According to the invention there are provided fibre-forming synthetic linear polyamides having an improved affinity for basic dyestuffs and which are obtained by polymerising a lactam having a ring of from 7 to 13 atoms or the corresponding amino acid, or substantially equimolecular proportions of a diamine which contains at least two carbon atoms between the amino groups and a dicarboxylic acid which contains at least two carbon atoms between the carboxylic acid groups, in the presence of a metal cyclohexane monosulphonate containing two

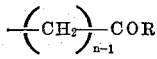

groups wherein $n$ is 1 or 2, and R is a hydroxy, alkoxy or amino group or, where R is hydroxy, in the presence of a diamine salt thereof.

The alkoxy radicals represented by R are preferably lower alkoxy radicals containing from 1 to 4 carbon atoms such as methoxy and ethoxy.

The said polymerisation can be carried out under the conditions normally employed for the polymerisation of polyamide-forming components comprising lactams or mixtures of diamines and dicarboxylic acids. The said metal cyclohexane sulphonate or the diamine salt thereof can be added at any stage of the polymerisation cycle. However it is preferred to add the said metal compound during the initial stages of the polymerisation, and preferably at the stage of charging the reactants to the polymerisation vessel. Instead of adding a diamine salt of the said sulphonate there can be added the corresponding amounts of the sulphonate containing two

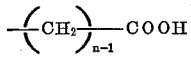

groups and a diamine.

It is preferred to use not more than 20 molar percent of the said sulphonate or diamine salt thereof, and, above all, between 0.1 and 5.0 molar percent of the said sulphonate or diamine salt thereof based on the recurring units of the polyamide chain. The metal salts of the said cyclohexane monosulphonic acids are preferably alkaline earth metal salts, such as calcium and barium, magnesium and, above all, alkali metal salts in particular sodium and potassium salts. As an alternative there can be used the ammonium salt of the said sulphonic acid. The diamine salts of the said sulphonates are preferably the salts of the said sulphonate with an aliphatic diamine of the formula $H_2N(CH_2)_pNH_2$ wherein $p$ is an integer of from 2 to 8. When the polyamide is being obtained by polymerisation of substantial equimolecular proportions of a diamine and a dicarboxylic acid, for example hexamethylenediamine and adipic acid, then it is preferred that the same diamine is used to form the salt of the sulphonate.

The metal cyclohexane sulphonates containing two

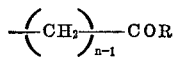

groups can themselves be obtained by hydrogenation of the metal salt of the corresponding benzene sulphonic acid containing two

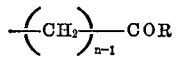

groups in the presence of a catalyst such as pallidised carbon. As a specific example of a cyclohexane monosulphonic acid containing two

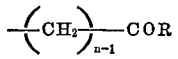

groups, there may be mentioned 1:3-dicarboxy cyclohexane-5-sulphonic acid.

When the polyamides are to be obtained from a substantially equimolecular proportion of a diamine and a dicarboxylic acid the said compounds can be used in the form of a salt of each other; thus, for example, hexamethylene diammonium adipate can be used instead of a mixture of equimolecular proportions of adipic acid and hexamethylenediamine. However, under the conditions of the polymerisation, the said salts dissociate into the diamine and the dicarboxylic acid which then react together to form the polyamides.

In this specification the term "substantially equimolecular proportions" (of the diamine and of the dicarboxylic acid) is used to cover both strict equimolecular proportions of the two types of reactants and the slight departures therefrom which are involved in conventional viscosity stabilising techniques.

Polymerisation is preferably carried out at a temperature between 200° C. and 350° C. and in the absence of air until the required degree of polymerisation is obtained. The polymerisation is usually carried out in aqueous medium, the water initially present and that formed in the polymerisation reaction being allowed to escape, as steam, from the polymerisation vessel.

As examples of the said polymerisable lactams having a ring of from 7 to 13 atoms or aminoacids thereof, there may be mentioned ε-aminocaproic acid, caprolactam, 9-aminononanoic acid, 11-aminoundecanoic acid, dodecanolactam and enantholactam.

As examples of the said diamines there may be mentioned m- or p-xylylenediamine, but preferably diamines of the general formula $H_2N(CH_2)_pNH_2$ wherein $p$ is an integer of from 2 to 8, such as trimethylenediamine, tetramethylenediamine, pentamethylenediamine, octamethylenediamine and, above all, hexamethylenediamine.

As examples of the said dicarboxylic acids there may be mentioned isophthalic acid and terephthalic acid, but preferably the dicarboxylic acids of the formula $$HOOC \cdot Y \cdot COOH$$

wherein Y is a divalent aliphatic radical containing at least 2 carbon atoms, and as examples of such acids there may be mentioned sebacic acid, octadecanedioic acid, suberic acid, azelaic acid, undecanedioic acid, glutaric acid, pimelic acid and, above all, adipic acid.

If desired other ingredients, such as delustrants, light stabilisers, heat stabilisers and fillers which are commonly present in fibre-forming polyamides, can be added at any stage of the polymerisation process. If desired the polymerisation can be effected in the presence of molecular weight regulators such as acetic acid.

The polyamides of the invention can be converted into fibres by any of the conventional methods of producing fibres from polymers, for example by melt spinning. The resulting fibres have excellent affinity for basic dyestuffs, (such as are described on pp. 1617 to 1654 of the second edition of the Colour Index which was published in 1956), and this affinity is much greater than that of fibres obtained from the corresponding polymers which were prepared in the absence of the said metal cyclohexane monosulphonates. The resulting fibres have little or no affinity for acid dyestuffs, and when these fibres are mixed with fibres of normal polyamides and/or of polyamides which have improved affinity for acid dyestuffs and the resulting unions are dyed with acid dyestuffs, contrasting multicoloured patterned effects are obtained.

The invention is illustrated but not limited by the following examples in which the parts and percentages are by weight:

EXAMPLE 1

262 parts of hexamethylene diammonium adipate, 49 parts of an aqueous solution containing 12% of sodium 1:3-dicarboxycyclohexane 5-sulphonate, 2,5 parts of hexamethylenediamine, 70 parts of water, and 13.95 parts of a 21.5% aqueous solution of acetic acid are charged into a stainess steel autoclave. The autoclave is heated to 110° C., purged with steam to remove all the air present, then closed, and heating is continued until a pressure of between 250 and 300 lbs./sq. inch is obtained. Heating is then continued until a temperature of 235° to 240° C. is obtained, the pressure being maintained at between 250 and 300 lbs./sq. inch by slowly releasing steam from the autoclave. The pressure in the autoclave is then slowly reduced to atmospheric pressure whilst the temperature is raised to 268° C. After 15 minutes at this temperature the polymer is discharged from the autoclave in the form of a ribbon, which is then quenched, chipped and dried.

The polymer chips are then converted by melt spinning into the form of fibres which have a much higher affinity for basic dyestuffs, when applied from an aqueous dyebath, than fibres of a polyamide which was similarly prepared except that the aqueous solution of the sodium 1:3-dicarboxycyclohexane-5-sulphonate was omitted from the autoclave.

The aqueous solution of sodium 1:3-dicarboxycyclohexane-5-sulphonate was itself obtained as follows:

A solution of 152 parts of the trisodium salt of 5-sulphoisophthalic acid in 600 parts of water and 25 parts of carbon containing 3% of finely divided palladium were charged to an autoclave and hydrogen was introduced to an initial pressure of 250 atmospheres. The autoclave was then rotated for 30 hours at 250° C. The mixture was then discharged from the autoclave, filtered to remove the carbon, and the filtrate passed through a column containing Amberlite I.R. 120H resin (a sulphonated crosslinked polystyrene resin) to give 750 parts of an aqueous solution containing 12% of sodium 1:3-dicarboxycyclohexane-5-sulphonate.

What is claimed is:

1. Fiber-forming synthetic linear polycarbonamide having an improved affinity for basic dyestuffs and which are obtained by polymerizing the monomer obtained from substantially equimolecular proportions of a saturated aliphatic diamine which contains at least 2 carbon atoms between the amino groups and a saturated aliphatic dicarboxylic acid which contains at least 2 carbon atoms between the carboxylic acid groups in the presence of from between 0.1 and 5.0 molar percent based on the recurring units of the polyamide chain of a metal cyclohexane monosulfonate containing two —COR groups wherein R is a hydroxy or alkoxy group, or when R is a hydroxy in the presence of a diamine salt thereof, said metal being a metal selected from the group consisting of calcium, barium, magnesium, sodium and potassium, said diamine salt being the salt of said sulfonate with an aliphatic diamine of the formula $H_2N(CH_2)_pNH_2$ wherein $p$ is an integer of from 2 to 8.

2. Fiber-forming synthetic linear polyamide as claimed in claim 1 which are obtained by polymerizing the monomer obtained from substantially equimolecular proportions of hexamethylene diamine and adipic acid in the presence of said metal cyclohexane monosulfonate.

3. Fiber-forming synthetic linear polyamide as claimed in claim 1 wherein said metal cyclohexane monosulfonate is sodium 1:3-dicarboxy cyclohexane 5-sulfonate.

References Cited

UNITED STATES PATENTS

| | | | |
|---|---|---|---|
| 3,184,436 | 5/1965 | Magat | 260—78 R |
| 3,235,533 | 2/1966 | Brinkman | 260—78 R |
| 3,538,057 | 11/1970 | Lafoe | 260—78 R |
| 3,560,448 | 2/1971 | Lodge | 260—78 R |

HAROLD D. ANDERSON, Primary Examiner

U.S. Cl. X.R.

8—173, 178 R; 260—78 R, 78 L